(12) United States Patent
Scott

(10) Patent No.: US 9,992,281 B2
(45) Date of Patent: Jun. 5, 2018

(54) ACCOUNTABLE CONTENT STORES FOR INFORMATION CENTRIC NETWORKS

(71) Applicant: CISCO TECHNOLOGY, INC., San Jose, CA (US)

(72) Inventor: Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 136 days.

(21) Appl. No.: 14/267,769

(22) Filed: May 1, 2014

(65) Prior Publication Data

US 2015/0319241 A1 Nov. 5, 2015

(51) Int. Cl.
*H04L 29/08* (2006.01)

(52) U.S. Cl.
CPC ...... *H04L 67/1097* (2013.01); *H04L 67/2842* (2013.01)

(58) Field of Classification Search
CPC ............. H04L 67/1097; H04L 67/2842; G06F 17/30864
USPC ....................................................... 709/214
See application file for complete search history.

(56) References Cited

U.S. PATENT DOCUMENTS

| 817,441 | A | 4/1906 | Niesz |
|---|---|---|---|
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

(Continued)

*Primary Examiner* — Nicholas Taylor
*Assistant Examiner* — Chong G Kim

(57) ABSTRACT

A set of Content Store nodes of an information-centric network (ICN) can cache data, and can processes an Interest for this data based on a domain assigned to the requested data. During operation, a CS node can receive a Content Object that is to be cached, and processes the Content Object by determining a domain associated with the Content Object. The CS node selects a storage repository associated with the domain, and stores the Content Object in the selected repository. The CS node can also receive an Interest for a piece of content, and processes the Interest by performing a lookup operation for a rule associated with the Interest's name. The rule can include a set of commands for performing a programmatic operation. Then, if the CS node finds a matching rule, the CS node can execute the rule's commands to perform the programmatic operation.

19 Claims, 7 Drawing Sheets

(56) References Cited

U.S. PATENT DOCUMENTS

| | | | |
|---|---|---|---|
| 5,845,207 A | 12/1998 | Amin | |
| 5,870,605 A | 2/1999 | Bracho | |
| 6,047,331 A | 4/2000 | Medard | |
| 6,052,683 A | 4/2000 | Irwin | |
| 6,085,320 A | 7/2000 | Kaliski | |
| 6,091,724 A | 7/2000 | Chandra | |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kap Lan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,246,159 B2 | 7/2007 | Aggarwal | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,553,562 B2 | 10/2013 | Allan | |
| 8,572,214 B2 | 10/2013 | Garcia-Luna-Aceves | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B1 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,863,227 B2 * | 10/2014 | Zhang | G06F 21/10 713/171 |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 | 5/2015 | Traina | |
| 9,071,498 B2 | 6/2015 | Beser | |
| 9,112,895 B1 | 8/2015 | Lin | |
| 9,137,152 B2 | 9/2015 | Xie | |
| 9,253,087 B2 | 2/2016 | Zhang | |
| 9,270,598 B1 | 2/2016 | Oran | |
| 9,280,610 B2 | 3/2016 | Gruber | |
| 9,380,326 B1 * | 6/2016 | Corley | H04L 29/06482 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |

(56) References Cited

U.S. PATENT DOCUMENTS

| | | |
|---|---|---|
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |

(56) References Cited

U.S. PATENT DOCUMENTS

| | | | |
|---|---|---|---|
| 2009/0276396 A1 | 11/2009 | Gorman | |
| 2009/0285209 A1* | 11/2009 | Stewart | H04L 65/1069 370/389 |
| 2009/0287835 A1* | 11/2009 | Jacobson | H04L 67/104 709/229 |
| 2009/0287853 A1 | 11/2009 | Carson | |
| 2009/0288076 A1 | 11/2009 | Johnson | |
| 2009/0288143 A1 | 11/2009 | Stebila | |
| 2009/0288163 A1* | 11/2009 | Jacobson | G06F 15/173 726/22 |
| 2009/0292743 A1 | 11/2009 | Bigus | |
| 2009/0293121 A1 | 11/2009 | Bigus | |
| 2009/0296719 A1 | 12/2009 | Maier | |
| 2009/0300079 A1 | 12/2009 | Shitomi | |
| 2009/0300407 A1 | 12/2009 | Kamath | |
| 2009/0300512 A1 | 12/2009 | Ahn | |
| 2009/0307333 A1 | 12/2009 | Welingkar | |
| 2009/0323632 A1 | 12/2009 | Nix | |
| 2010/0005061 A1 | 1/2010 | Basco | |
| 2010/0027539 A1 | 2/2010 | Beverly | |
| 2010/0046546 A1 | 2/2010 | Ram | |
| 2010/0057929 A1 | 3/2010 | Merat | |
| 2010/0058346 A1 | 3/2010 | Narang | |
| 2010/0088370 A1 | 4/2010 | Wu | |
| 2010/0094767 A1 | 4/2010 | Miltonberger | |
| 2010/0094876 A1 | 4/2010 | Huang | |
| 2010/0098093 A1 | 4/2010 | Ejzak | |
| 2010/0100465 A1 | 4/2010 | Cooke | |
| 2010/0103870 A1 | 4/2010 | Garcia-Luna-Aceves | |
| 2010/0124191 A1 | 5/2010 | Vos | |
| 2010/0125911 A1 | 5/2010 | Bhaskaran | |
| 2010/0131660 A1 | 5/2010 | Dec | |
| 2010/0150155 A1 | 6/2010 | Napierala | |
| 2010/0165976 A1 | 7/2010 | Khan | |
| 2010/0169478 A1 | 7/2010 | Saha | |
| 2010/0169503 A1 | 7/2010 | Kollmansberger | |
| 2010/0180332 A1 | 7/2010 | Ben-Yochanan | |
| 2010/0182995 A1 | 7/2010 | Hwang | |
| 2010/0185753 A1 | 7/2010 | Liu | |
| 2010/0195653 A1* | 8/2010 | Jacobson | H04L 45/00 370/392 |
| 2010/0195654 A1 | 8/2010 | Jacobson | |
| 2010/0195655 A1 | 8/2010 | Jacobson | |
| 2010/0217874 A1 | 8/2010 | Anantharaman | |
| 2010/0217985 A1 | 8/2010 | Fahrny | |
| 2010/0232402 A1 | 9/2010 | Przybysz | |
| 2010/0232439 A1 | 9/2010 | Dham | |
| 2010/0235516 A1 | 9/2010 | Nakamura | |
| 2010/0246549 A1 | 9/2010 | Zhang | |
| 2010/0250497 A1 | 9/2010 | Redlich | |
| 2010/0250939 A1 | 9/2010 | Adams | |
| 2010/0257149 A1 | 10/2010 | Cognigni | |
| 2010/0268782 A1 | 10/2010 | Zombek | |
| 2010/0272107 A1 | 10/2010 | Papp | |
| 2010/0281263 A1 | 11/2010 | Ugawa | |
| 2010/0284309 A1 | 11/2010 | Allan | |
| 2010/0284404 A1 | 11/2010 | Gopinath | |
| 2010/0293293 A1 | 11/2010 | Beser | |
| 2010/0322249 A1 | 12/2010 | Thathapudi | |
| 2011/0013637 A1 | 1/2011 | Xue | |
| 2011/0019674 A1 | 1/2011 | Iovanna | |
| 2011/0022812 A1 | 1/2011 | vanderLinden | |
| 2011/0029952 A1 | 2/2011 | Harrington | |
| 2011/0055392 A1 | 3/2011 | Shen | |
| 2011/0055921 A1 | 3/2011 | Narayanaswamy | |
| 2011/0060716 A1 | 3/2011 | Forman | |
| 2011/0060717 A1 | 3/2011 | Forman | |
| 2011/0090908 A1* | 4/2011 | Jacobson | H04L 45/745 370/392 |
| 2011/0106755 A1 | 5/2011 | Hao | |
| 2011/0131308 A1 | 6/2011 | Eriksson | |
| 2011/0137919 A1 | 6/2011 | Ryu | |
| 2011/0145597 A1 | 6/2011 | Yamaguchi | |
| 2011/0145858 A1 | 6/2011 | Philpott | |
| 2011/0149858 A1 | 6/2011 | Hwang | |
| 2011/0153840 A1 | 6/2011 | Narayana | |
| 2011/0158122 A1 | 6/2011 | Murphy | |
| 2011/0161408 A1 | 6/2011 | Kim | |
| 2011/0202609 A1 | 8/2011 | Chaturvedi | |
| 2011/0219093 A1 | 9/2011 | Ragunathan | |
| 2011/0219427 A1 | 9/2011 | Hito | |
| 2011/0219727 A1 | 9/2011 | May | |
| 2011/0225293 A1 | 9/2011 | Rathod | |
| 2011/0231578 A1 | 9/2011 | Nagappan | |
| 2011/0239256 A1 | 9/2011 | Gholmieh | |
| 2011/0258049 A1 | 10/2011 | Ramer | |
| 2011/0264824 A1 | 10/2011 | Venkata Subramanian | |
| 2011/0265159 A1 | 10/2011 | Ronda | |
| 2011/0265174 A1 | 10/2011 | Thornton | |
| 2011/0271007 A1* | 11/2011 | Wang | H04L 45/306 709/238 |
| 2011/0280214 A1 | 11/2011 | Lee | |
| 2011/0286457 A1 | 11/2011 | Ee | |
| 2011/0286459 A1 | 11/2011 | Rembarz | |
| 2011/0295783 A1 | 12/2011 | Zhao | |
| 2011/0299454 A1 | 12/2011 | Krishnaswamy | |
| 2012/0011170 A1 | 1/2012 | Elad | |
| 2012/0011551 A1 | 1/2012 | Levy | |
| 2012/0023113 A1 | 1/2012 | Ferren | |
| 2012/0036180 A1 | 2/2012 | Thornton | |
| 2012/0045064 A1 | 2/2012 | Rembarz | |
| 2012/0047361 A1 | 2/2012 | Erdmann | |
| 2012/0066727 A1 | 3/2012 | Nozoe | |
| 2012/0106339 A1 | 5/2012 | Mishra | |
| 2012/0110159 A1* | 5/2012 | Richardson | G06F 17/30893 709/223 |
| 2012/0114313 A1 | 5/2012 | Phillips | |
| 2012/0120803 A1 | 5/2012 | Farkas | |
| 2012/0127994 A1 | 5/2012 | Ko | |
| 2012/0136676 A1 | 5/2012 | Goodall | |
| 2012/0136936 A1 | 5/2012 | Quintuna | |
| 2012/0136945 A1 | 5/2012 | Lee | |
| 2012/0137367 A1 | 5/2012 | Dupont | |
| 2012/0141093 A1 | 6/2012 | Yamaguchi | |
| 2012/0155464 A1 | 6/2012 | Kim | |
| 2012/0158912 A1* | 6/2012 | Jacobson | H04L 61/1582 709/219 |
| 2012/0158973 A1 | 6/2012 | Jacobson | |
| 2012/0163373 A1 | 6/2012 | Lo | |
| 2012/0166433 A1 | 6/2012 | Tseng | |
| 2012/0166806 A1* | 6/2012 | Zhang | H04L 9/3247 713/176 |
| 2012/0170913 A1 | 7/2012 | Isozaki | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0226902 A1 | 9/2012 | Kim | |
| 2012/0257500 A1 | 10/2012 | Lynch | |
| 2012/0284791 A1 | 11/2012 | Miller | |
| 2012/0290669 A1 | 11/2012 | Parks | |
| 2012/0290696 A1* | 11/2012 | Wu | G06F 17/30197 709/223 |
| 2012/0290919 A1 | 11/2012 | Melnyk | |
| 2012/0291102 A1 | 11/2012 | Cohen | |
| 2012/0297088 A1* | 11/2012 | Wang | H04L 63/0272 709/238 |
| 2012/0300669 A1 | 11/2012 | Zahavi | |
| 2012/0307629 A1 | 12/2012 | Vasseur | |
| 2012/0314580 A1 | 12/2012 | Hong | |
| 2012/0317307 A1 | 12/2012 | Ravindran | |
| 2012/0322422 A1 | 12/2012 | Frecks | |
| 2012/0323933 A1 | 12/2012 | He | |
| 2012/0331112 A1 | 12/2012 | Chatani | |
| 2013/0016695 A1* | 1/2013 | Ravindran | H04L 67/327 370/331 |
| 2013/0024560 A1 | 1/2013 | Vasseur | |
| 2013/0039249 A1* | 2/2013 | Ravindran | H04W 76/002 370/312 |
| 2013/0041982 A1 | 2/2013 | Shi | |
| 2013/0051392 A1 | 2/2013 | Filsfils | |

(56) References Cited

U.S. PATENT DOCUMENTS

| | | |
|---|---|---|
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0258878 A1* | 10/2013 | Wakikawa ........... G08G 1/0112 370/252 |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0290697 A1* | 10/2013 | Wang .................. H04L 63/0428 713/150 |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1* | 12/2013 | Hong ............... H04N 21/64784 725/34 |
| 2013/0332971 A1* | 12/2013 | Fisher .................. H04N 21/266 725/93 |
| 2013/0336103 A1 | 12/2013 | Vasseur |
| 2013/0336323 A1 | 12/2013 | Srinivasan |
| 2013/0339481 A1* | 12/2013 | Hong ..................... H04L 67/16 709/217 |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1* | 1/2014 | Calo ....................... H04L 45/34 370/392 |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0115052 A1* | 4/2014 | Silberstein .......... H04L 67/2823 709/204 |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233543 A1 | 8/2014 | Xie |
| 2014/0237085 A1 | 8/2014 | Park |
| 2014/0245359 A1* | 8/2014 | De Foy ............. H04W 36/0011 725/62 |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2014/0380427 A1* | 12/2014 | Srinivasan .............. H04L 63/08 726/4 |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1* | 2/2015 | Mosko .................. H04L 45/123 370/254 |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1* | 4/2015 | Ohnishi .................. H04L 1/004 709/223 |
| 2015/0095514 A1 | 4/2015 | Yu |
| 2015/0117253 A1* | 4/2015 | Scott .................... H04L 45/306 370/254 |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0200991 A1* | 7/2015 | Kwon .................... H04L 65/604 709/219 |
| 2015/0207633 A1 | 7/2015 | Ravindran |
| 2015/0207864 A1 | 7/2015 | Wilson |
| 2015/0222424 A1* | 8/2015 | Mosko ...................... H04L 9/08 713/171 |
| 2015/0270957 A1* | 9/2015 | Uzun ..................... H04L 9/0822 713/168 |
| 2015/0279348 A1 | 10/2015 | Cao |
| 2015/0281071 A1* | 10/2015 | Mosko ................... H04L 67/10 709/223 |
| 2015/0281083 A1* | 10/2015 | Kim .................... H04L 45/7457 370/235 |
| 2015/0288755 A1 | 10/2015 | Mosko |

(56) References Cited

U.S. PATENT DOCUMENTS

| | | |
|---|---|---|
| 2015/0312300 A1 | 10/2015 | Mosko |
| 2015/0319214 A1* | 11/2015 | Yu .................. H04L 65/4069 709/219 |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1* | 1/2016 | Oran .................. H04L 45/742 709/213 |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0149913 A1* | 5/2016 | Eriksson ............ G06F 21/6218 726/6 |
| 2016/0171184 A1 | 6/2016 | Solis |
| 2016/0173604 A1* | 6/2016 | Panigrahi ............ H04L 67/1097 709/216 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

B. Lynn. The Pairing-Based Cryptography Library, http://crypto.stanford.edu/pbc/.
C. Gentry and A. Silverberg. Hierarchical ID-Based Cryptography. Advances in Cryptology—ASIACRYPT 2002. Springer Berlin Heidelberg (2002).
D. Boner, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Symposium (2005).
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer ScienceVolume 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology -AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

(56) References Cited

OTHER PUBLICATIONS

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

(56) References Cited

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: a multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.

(56) References Cited

OTHER PUBLICATIONS

Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocor%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]** figures 1,2*.
Marc Mosko et al "All-In-One Streams for Content Centric Networks", May 24, 2015, retrieved from the Internet: http://www.ccnx.org/pubs/AllinOne.pdf[downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 11, 997, pp. 499-506 *the Whole Document*.
Sun et al.: "Content-Based Route Lookup Using CAMs", Global Communications Conference, IEEE, Dec. 3, 2012 *the Whole Document*.

\* cited by examiner

ACCOUNTABLE CONTENT STORES FOR INFORMATION CENTRIC NETWORKS

BACKGROUND

Field

This disclosure is generally related to cache servers. More specifically, this disclosure is related to distributed content stores that actively manage content caching over an Information Centric Network (ICN).

Related Art

Advances in portable Internet-enabled computing technologies have made it easier for people to consume digital content at any time of day, whether at home or on the road. People may use their personal computing device to communicate with others, to search for information that aids them in their daily tasks, and/or to stream music or other media content over the Internet. However, the popularity of the Internet can overwhelm an online service with simultaneous requests from a plurality of users, from various geographic locations. If the online service cannot handle requests from client devices in a timely manner, users of the online service may experience delays that interfere with their user experience. If this happens often, the users may perceive the online service to be of low quality, and may even decide to switch to a competing online service that does not suffer from such latencies.

To better serve content to users, system administrators or service providers oftentimes deploy a set of web servers to host the online content, and may leverage a plurality of cache servers across various geographic locations to serve the content to the client devices. As more users sign up with the online service, the system administrator can deploy additional cache servers to improve performance to the client devices.

However, cache servers are oftentimes designed to cache only data that is most-frequently or most recently requested by the client devices. This improves the request response time for popular data, which makes the web service responsive to requests from most client devices. Unfortunately, when a client device issues a request for unpopular data, it is likely that this unpopular data has not been cached at a cache server, which can result in an undesirably long request response time. For example, a movie-streaming service may store popular movies on various cache servers, which allows the movie-streaming service to provide the movie to client devices in a high-definition format. However, if a user desires to watch a movie that is not currently popular, the movie-streaming service may need to service this movie directly from a server configured to handle unpopular content or a slower machine with direct access to the full content catalogue. The streaming performance from the media-storage server to the client device may be inferior to that from a nearby cache server, which can result in buffering issues during content playback, or may require the media-storage server to stream a lower-resolution version of the media stream.

SUMMARY

One embodiment provides a set of Content Store nodes of an information-centric network (ICN) that can cache data, and can processes an Interest for this data based on a domain assigned to the requested data. During operation, a Content Store node can receive a Content Object that is to be cached. The Content Store node can process the Content Object by determining a domain associated with the Content Object, and selecting a storage repository associated with the domain. The Content Store node can then store the Content Object in the selected repository.

In some embodiments, the Content Store node manages a plurality of repositories, such that a respective repository of the plurality of repositories is associated with one or more domains.

In some embodiments, the Content Store node can assign a respective repository to a domain based an administrative attribute of the repository, a typological attribute of the repository, a performance attribute of the repository, an ontological attribute of the repository, and/or a security attribute of the repository.

In some embodiments, the storage repository can include a memory device, a local non-volatile storage device, a network storage device, a distributed data store, or a database.

In some embodiments, while determining the domain for the Content Object, the Content Store node can identify one or more attributes of the Content Object, and selects a domain associated with one or more of the identified attributes.

In some embodiments, the identified attributes of the Content Object can include an owner, a data size, a content name, a signer of the Content Object, a digital signature, a lifetime of the Content Object, and/or an access frequency of the Content Object.

In some embodiments, the Content Store node can analyze the Content Object to determine a content producer associated with the Content Object. Also, while determining the domain for the Content Object, the Content Store node can determine a domain associated with the content producer for the Content Object.

In some embodiments, the Content Store node can receive an Interest which specifies a cached Content Object's name. The Content Store node can process the Interest by determining a set of domains associated with the Content Object, and determining, from the set of domains, a domain which the Interest has permission to access. The Content Store node then returns the Content Object from a repository assigned to the determined domain.

One embodiment provides a set of Content Store nodes that automatically manages a cache repository by executing rules triggered by Interests for Content Objects stored in the repository. During operation, a Content Store node can receive an Interest for a piece of content. The Content Store node can process the Interest by performing a lookup operation for a rule associated with the Interest's name, such that the rule includes a set of commands for performing a programmatic operation. Then, in response to obtaining the rule, the Content Store can execute the rule's commands to perform a predefined operation.

In some embodiments, the Content Store node can search through one or more local repositories to determine whether a local repository stores a Content Object which satisfies the Interest.

In some embodiments, if a local repository stores the Content Object, the Content Store node can perform the lookup operation to obtain a rule associated with a cache hit for the Content Object.

In some embodiments, if the one or more local repositories do not store the Content Object, the Content Store node can perform the lookup operation to obtain a rule associated with a cache miss for the Content Object.

In some embodiments, the rule's commands configure the Content Store node to determine a set of other Content Objects associated with the Interest, and to select a target repository for storing the other Content Objects. Also, the rule's commands configure the Content Store node to obtain the other Content Objects over an information centric network, and store the other Content Objects in the target repository.

In some embodiments, the rule's commands configure the Content Store node to select a repository storing other Content Objects associated with the Interest, and to bring the repository online.

In some embodiments, the rule's commands configure the Content Store node to gather real-time information associated with the Interest's name, to generate one or more Content Objects that contain the real-time information, and store the generated Content Objects in a target repository.

In some variations on these embodiments, the real-time monitoring information includes a historical statistical performance for one or more Content Objects, an instantaneous statistical performance for the Content Objects, attributes for clients that request the Content Objects, a cache hit rate for a repository, and/or a cache-miss rate for the repository.

In some embodiments, the Content Store node can receive an Interest whose name identifies a type of monitoring information, and returns a Content Object that includes the requested monitoring information.

In some embodiments, when the Content Store node generates a Content Object that includes real-time monitoring information, the Content Store node identifies a target network device that is to receive a type of monitoring information associated with the generated Content Object, and sending the generated Content Object to the target network device.

BRIEF DESCRIPTION OF THE FIGURES

In the figures, like reference numerals refer to the same figure elements.

DETAILED DESCRIPTION

Figure 1:
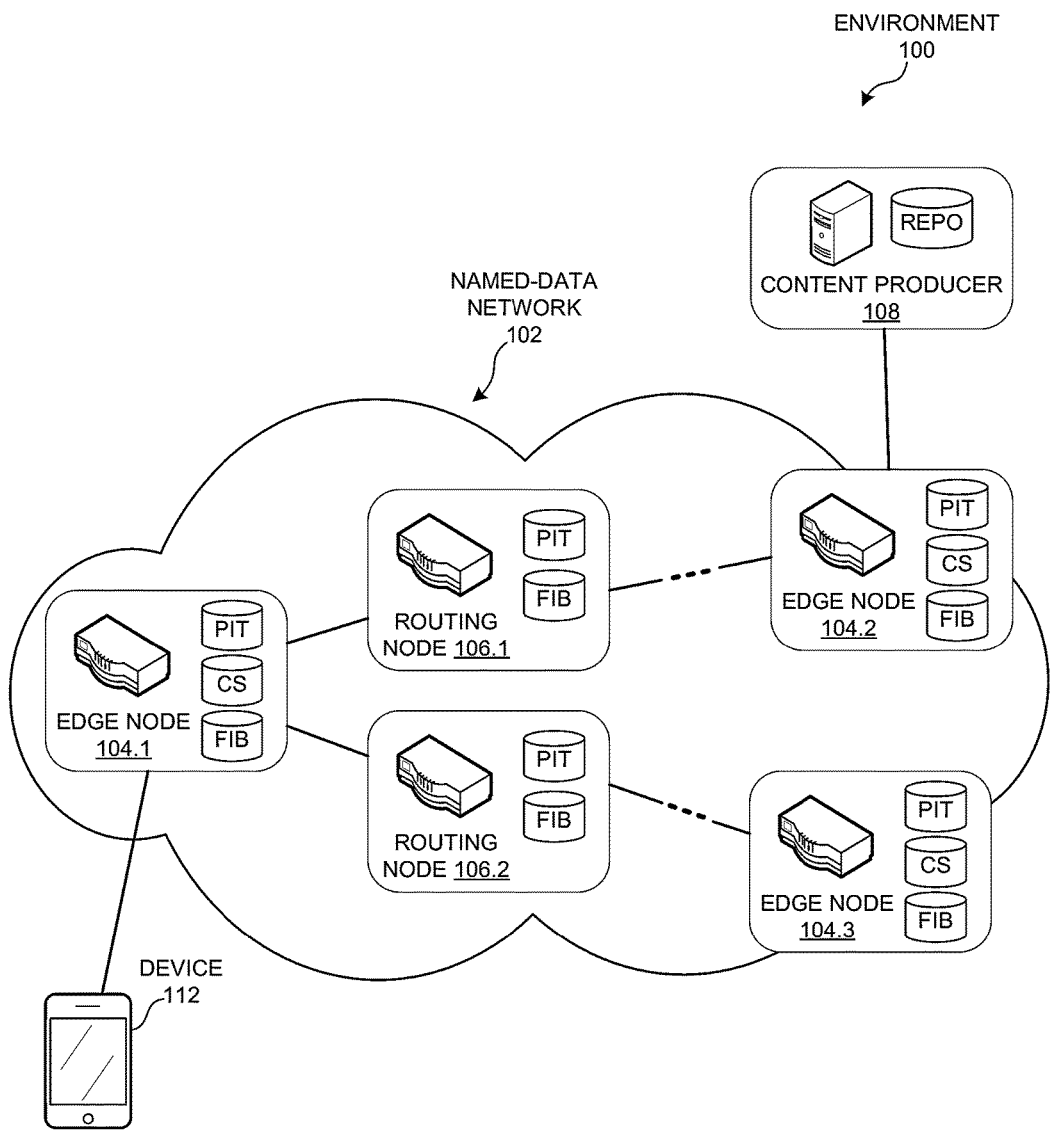
FIG. 1 illustrates an exemplary computing environment that facilitates caching data at various CS nodes for a publisher based on a domain associated with the publisher in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of optimizing data stored across various cache servers by providing a set of Content Store (CS) nodes that automatically retrieve or move Content Objects to CS nodes that may receive Interests for these Content Objects. For example, a CS node can cache a first segment of a rarely-accessed data stream, and pre-fetches later segments of the data stream after receiving an Interest for the first segment.

Content centric networking (CCN) is designed to make content available by name, regardless of which endpoint stores the content. Hence, CS nodes can be deployed across a CCN to cache content and make this content available to segments of the CCN. A client device can obtain the content by disseminating an Interest that names the content. If the Interest reaches a CS node that stores the content, this CS node can return the content without requiring the producer of the content to receive the Interest or return the content.

However, typical CS nodes cache only data that is most-frequently or most recently requested by client devices. These CS nodes typically write over the least-recently accessed Content Objects to store new data. If a CS node is along a high-bandwidth path, such as at a terabit router, this CS node would need to maintain a substantially large repository to ensure that popular content can be cached for a significant duration (e.g., a day). If the repository at a typical CS node is not sufficiently large, the CS node may need to write over even the popular data to make space for new Content Objects.

In some embodiments, a CS node can assign each Content Object to a domain, which allows the CS node to treat different types of Content Objects in a custom way. Also, the CS node can assign one or more domains to a storage repository. This allows a service provider to configure delivery attributes for the attributes, such as to configure which clients can access the repository, and to configure performance attributes associated with their delivery. The CS node can also use rules associated with Content Objects or domains to perform predetermined actions on the Content Objects, such as to pre-cache other related Content Objects, or to perform load balancing across a set of CS nodes.

In some embodiments, the CS nodes operate in an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates an exemplary computing environment 100 that facilitates caching data at various CS nodes for a publisher based on a domain associated with the publisher in accordance with an embodiment. Computing environment 100 can include a named-data network 102 (or an information-centric network), which includes a plurality of edge nodes 104 and routing nodes 106. For example, network 102 can be managed by an Internet service provider (ISP), and can include an edge node 104.1 that provides network access to a plurality of client devices. Network 102 can also include an edge node 104.2 that provides network access to a plurality of online services, and/or that interfaces with a back-haul network accessible by a plurality of online services. Edge nodes 104 can each implement a CS node by including a Content Store with one or more repositories.

Computing environment 100 can also include other network devices that can disseminate Interest packets across network 102. For example, an online-service provider can deploy an online service at a content producer 108 that is accessible via network 102. Content producer 108 can include a server computer or a computer cluster that interfaces with edge node 104.2 of network 102, and can include a repository that stores data for one or more users. If a client device 112 disseminates an Interest for a Content Object hosted by Content Producer 108, device 112 can receive the Content Object from edge node 104.1 if the Content Store at edge node 104.1 has cached the Content Object. Otherwise, the routing nodes of NDN 102 can forward the Interest toward Content Producer 108. If edge node 104.2 has cached the Content Object, edge node 104.2 can return the Content Object to satisfy the Interest. Otherwise, edge node 104.2 forwards the Interest toward Content Producer 108. Once Content Producer 108 returns the Content Object along the return path to client device 112, the Content Stores at edge nodes 104.1 and 104.2 can cache the Content Object to satisfy later Interests.

In some embodiments, a group of CS nodes can achieve cache-based global load balancing. For example, in ICN, a client can disseminate an Interest for a piece of data, and ICN routers can forward the Interest toward a node that can return a Content Object that satisfies the Interest. If a router does not know how to process the Interest, the router can forward the Interest using a default route to eventually reach a node that can satisfy the Interest. Once the Content Object is returned to the client, one or more CS nodes along the return path can cache the Content Object, and they can use the cached Content Object to satisfy later Interests for the Content Object. This naturally allows content to be cached at various geographic locations near where the content is being requested.

Also, in some embodiments, a CS node can segregate the different types of storage space it uses into different domains, such as to perform customer-specific reservation where a domain is assigned to each customer and one or more storage repositories can be assigned to a domain. The CS node can also determine the class of service that a customer or a client can receive based on their association to a domain. This type of service quality management is not possible using typical cache servers, given that a typical domain name system (DNS) server merely forwards HTTP requests to a predetermined cache server without regard to domain membership.

For example, in some embodiments, a CS node can host data for a customer that implements a video streaming service. This streaming service can establish a high-performance repository for paid subscribers, and can establish a lower-performance repository for other clients. A client can access data hosted by the video streaming service by disseminating a sequence of Interests for segments of the video stream, such that any network node along the named data network can respond to an Interest by returning a Content Object that includes the requested stream segment. In many cases, the streaming service may be caching the video stream at the high-performance repository as well as the lower-performance repository.

If the Interest has permission to access a domain associated with the high-performance repository, the CS node processes the Interest using data hosted by the high-performance repository. Otherwise, the CS node uses the lower-performance repository. The lower-performance repository may be overburdened by requests from non-paying clients, and may need to return the requested video segments using a reduced video bitrate. On the other hand, the high-performance repository may be able to return the video segments in a high-definition format due to higher performance characteristics of the repository as well as due to the reduced load from paying clients.

In some embodiments, multiple CS nodes can operate as a group, and interoperate with each other to copy or move Content Objects among the CS nodes as necessary. If a repository at one CS node becomes full, the CS node can automatically copy cached Content Objects from this repository to another repository (e.g., a repository assigned to the same domain), without affecting the streaming experience from clients that are consuming cached data from these CS nodes. Whenever two CS nodes move data from one CS node to another, these CS nodes can update routing information to reflect the content that has been copied or moved between the CS nodes.

An administrator of a service provider can balance the load across the CS nodes by offloading cached Content Objects from an overloaded CS node (e.g., a node overloaded with requests) to other CS nodes with an available bandwidth. For example, the service provider may be leasing storage space at the CS nodes, and the administrator may periodically rebalance the data cached at these leased repositories to maximize their use. This can allow the service provider's repositories at a CS node to properly handle Interests for a special streaming event (e.g., a popular live sporting event) by offloading other content to other underused CS nodes.

Domain-Based Object Caching

Figure 2:
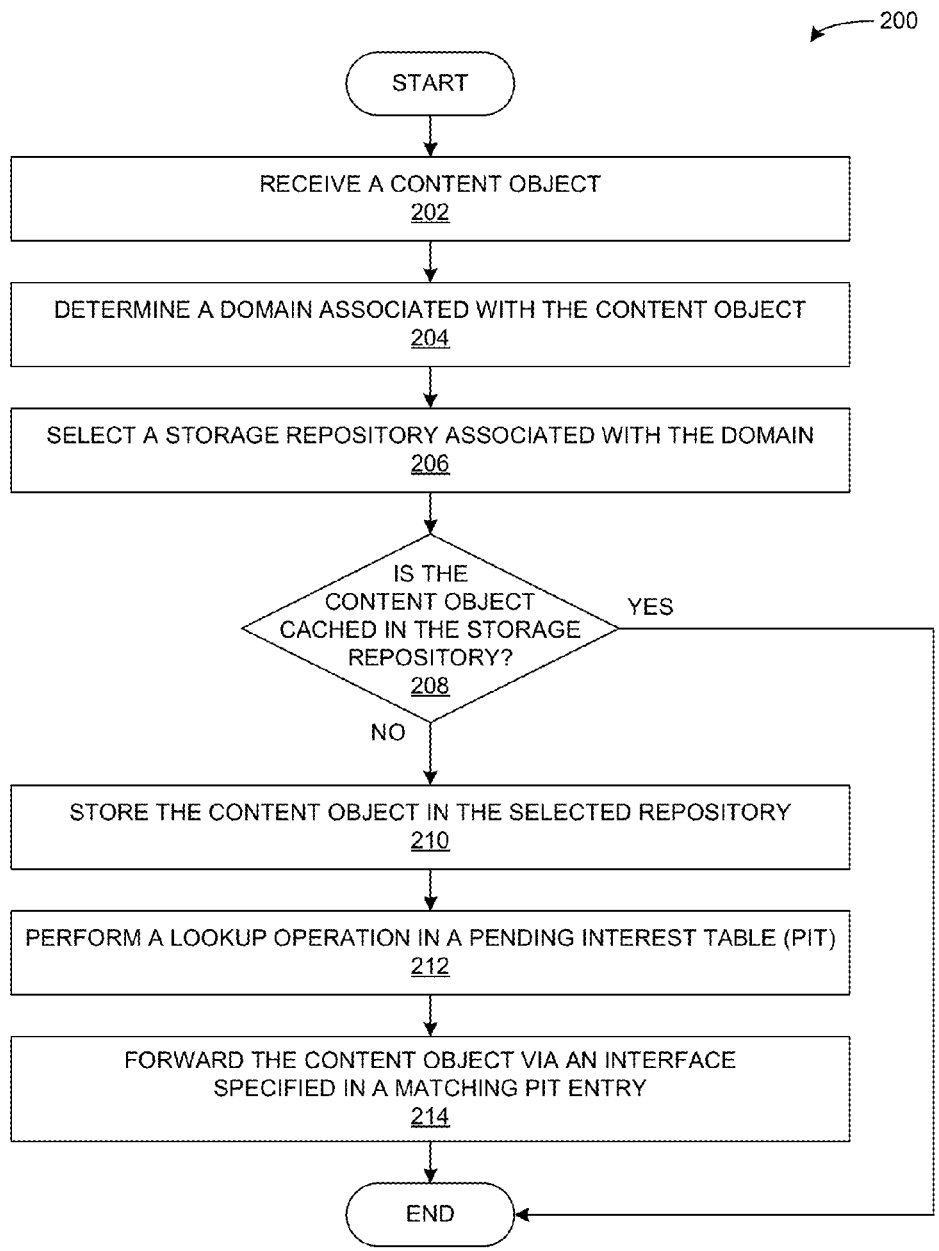
FIG. 2 presents a flow chart illustrating a method for processing a Content Object at a Content Store in accordance with an embodiment.

FIG. 2 presents a flow chart illustrating a method 200 for processing a Content Object at a Content Store in accordance with an embodiment. During operation, the CS node can receive a Content Object (operation 202), and determines a domain associated with the Content Object (operation 204). The CS node uses the domain to select a repository associated with the domain (operation 206).

The CS node then determines whether the Content Object is cached in the selected repository (operation 208). If the Content Object is not cached in the repository, the CS node stores the Content Object in the selected repository (operation 210). In some embodiments, the CS node can include a router or forwarder of the named data network. Hence, the CS node can perform a lookup operation in a Pending Interest Table (PIT) to determine an interface associated with a pending Interest (operation 212). If a matching PIT entry exists, the CS node can forward the Content Object via the interface specified in the PIT entry (operation 214).

In some embodiments, the CS node can determine the domain by analyzing attributes associated with the Content Object, and selecting a domain associated with one or more of these attributes. These Content Object attributes can include an owner, a data size, a content name, a signer of the Content Object, a digital signature, a lifetime of the Content Object, and/or an access frequency of the Content Object. For example, some publishers may lease storage space from the CS node, such that the CS node guarantees a certain level of performance from this storage space. The performance can include, for example, an Interest-processing delay, a data bandwidth, or any other network or processing performance attribute for the repository at the CS node. Hence, the CS node can include one domain per publisher, and determines the domain by obtaining publisher information from the Content Object. Once the CS node determines the domain for the publisher, the CS node can store the Content Object using a repository that's being leased by the publisher.

Domain-Based Interest Handling

Figure 3:
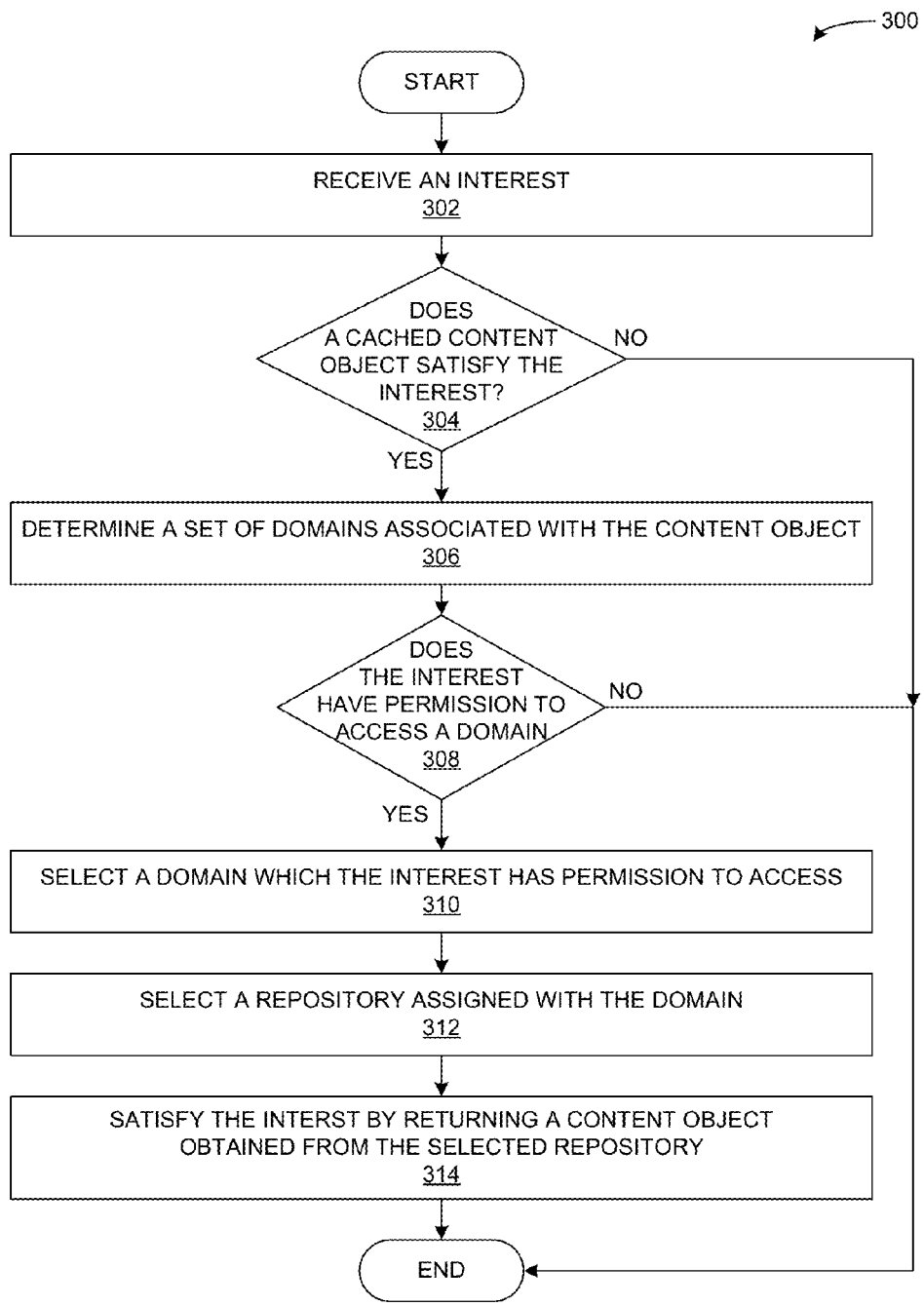
FIG. 3 presents a flow chart illustrating a method for processing an Interest for a Content Object based on domains associated with the Content Object in accordance with an embodiment.

FIG. 3 presents a flow chart illustrating a method 300 for processing an Interest for a Content Object based on domains associated with the Content Object in accordance with an embodiment. During operation, the CS node can receive an Interest (operation 302), and determines whether a cached Content Object satisfies the Interest (operation 304). If the CS node is not storing a Content Object that satisfies the Interest, the CS node can perform a remedial action, such as to identify an interface toward another network device that can process the Interest (e.g., by performing a lookup operation in a Forwarding Information Base), and forwarding the Interest along this interface.

On the other hand, if the CS node is storing a cached copy of a Content Object that satisfies the Interest, the CS node can determine how to handle the Content Object based on one or more domains associated with the Content Object, and using a domain that the Interest has permission to access. For example, the CS node can determine a set of domains associated with the Content Object (operation 306), and determines whether the Interest (or a client that issued the Interest) has valid permission or privileges to access one or more of these domains (operation 308).

If the Interest (or the client) does have valid permission, the CS node can select a domain which the Interest has permission to access (operation 310), and selects a repository which has been assigned to the domain (operation 312). Once the CS node selects a repository to use for processing the Interest, the CS node proceeds to satisfy the Interest by obtaining and returning a Content Object from the selected repository (operation 314).

For example, a publisher can lease a high-performance repository that can stream data at a high bitrate, and uses this repository to stream data (e.g., a high-definition video stream) to paid subscribers. The CS node can associate a subscriber-only domain to the publisher, and can assign the high-performance repository to the subscriber-only domain. Other consumers may still be allowed to access the same or similar data, but their requests would be handled using a default repository that is accessible by the general public. To implement this, the CS node can use a default domain (and any default repository assigned to this domain) to handle Interests from non-subscribers, or can assign a general-consumer domain to the publisher. This general-consumer domain can have a set of lower-performance repositories that are to be shared by the general public.

Hence, the paid subscribers can issue Interests that are allowed access to a subscriber-only domain associated with the publisher, and the other consumers are only allowed access to a general-consumer domain associated with the publisher or to a default domain associated with the local CS node. This allows the paid subscribers to receive, for example, a high-definition version of a video stream from the high-performance repository, and allows other consumers to access the same data in a lower-resolution format from the default repository.

Rule Processing for ICN Content Stores

Figure 4:
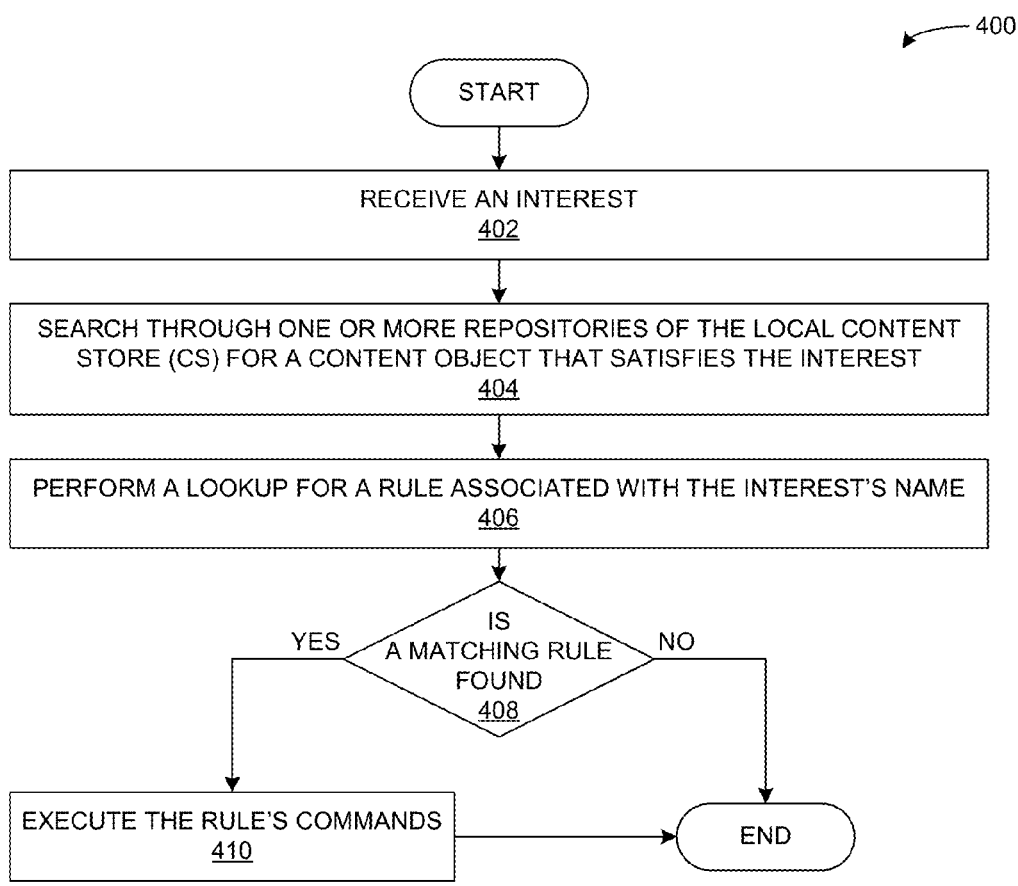
FIG. 4 presents a flow chart illustrating a method for selecting and executing a rule associated with a Content Object in accordance with an embodiment.

FIG. 4 presents a flow chart illustrating a method 400 for selecting and executing a rule associated with a Content Object in accordance with an embodiment. During operation, the CS node can receive an Interest (operation 402), and searches through one or more repositories for a Content Object that satisfies the Interest (operation 404). The CS node also performs a lookup for a rule associated with the Content Object (operation 406). The rule can include a name for a Content Object that is to trigger the rule, and includes a set of commands that the CS node is to execute once the rule is triggered. If a matching rule is found (operation 408), the CS node can execute the rule's commands to perform a predetermined operation (operation 410).

Figure 5:
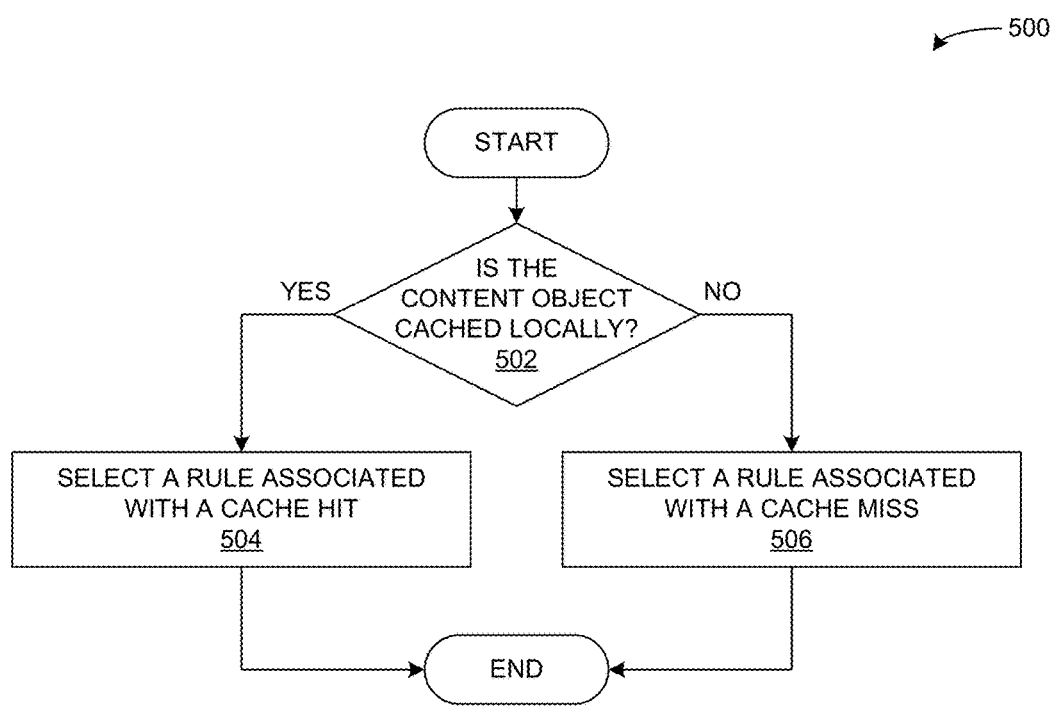
FIG. 5 presents a flow chart illustrating a method for selecting a rule based on a cache hit or cache miss for a Content Object in accordance with an embodiment.

In some embodiments, the CS node can perform the lookup operation for a rule based on a determination on whether the CS node stores the Content Object in a local repository. FIG. 5 presents a flow chart illustrating a method 500 for selecting a rule based on a cache hit or cache miss for a Content Object in accordance with an embodiment. During operation, the CS node can process an Interest by determining whether a Content Object that satisfies the Interest is cached locally (operation 502). If so, the CS node can select a rule associated with a cache hit (operation 504). Otherwise, the CS node can select a rule associated with a cache miss (operation 506).

In some embodiments, if the CS node detects a cache hit, the CS node can obtain and execute one or more rules that are to be performed when a client accesses a cached Content Object. Some rules can include commands to configure the CS node to make other related Content Objects available. This can allow a streaming service to create rules that are triggered by a first block in a data stream, such that the rule's commands can cause the CS node to prepare later blocks of the data stream to be available. For example, the rule's commands can configure the CS node to make the other related Content Objects accessible by selecting a repository that stores the related Content Objects, and bringing this repository online.

As another example, the CS node can pre-fetch subsequent blocks of the data stream into a predetermined target repository. This allows the streaming service to lease a limited amount of high-performance storage, such as an in-memory repository, and to pre-fetch content into the high-performance repository as needed. The streaming service does not need to pay for high-performance caching for a data stream that is seldom accessed (e.g., an unpopular movie), but can provide a high-performance streaming experience by pre-fetching the remainder of the stream into the high-performance repository. Prefetching content also allows a set of distributed CS nodes to actively manage the content they host by executing rules that move data from one CS node to another in anticipation of Interests for the data.

To achieve content prefetching, a CS node can execute the rule's commands to determine a set of other Content Objects that is to be pre-fetched (e.g., other Content Objects associated with the cache hit Content Object), and to select a target repository for storing the other Content Objects. Then, the CS node can obtain the other Content Objects over an information centric network (or from a local low-performance repository), and stores the other Content Objects in the target repository.

In some embodiments, some rules can activate an alert, or can perform other operations on an Interest that experienced a cache miss or on a Content Object returned by a cache hit. For example, a rule for a cache hit or for a cache miss can configure the CS node to gather real-time information associated with the Interest. The CS node generates one or more Content Objects that contain the real-time information, and stores the generated Content Objects in a target repository. This real-time monitoring information can include usage characteristics that reflect historical and/or instantaneous statistical performance of the Content Object or of the repository at which the Content Object is stored.

In some embodiments, the usage characteristics of the monitoring information can identify content that is cached in a repository, but that has not been used for a predetermined time interval. If a CS node is caching Content Objects that are not being used or requested, the CS node can analyze the usage characteristics to identify the unused Content Objects, and removes these unused Content Objects from the repository to make room for other Content Objects. A service provider can also analyze the usage characteristics to determine an amount of a storage repository that is being used, and what data (or type of data) this storage repository is storing. If the service provider is leasing the repository from the CS node, the service provider can configure which data (or type of data) is to be stored at the repository, for example, to ensure that the CS node does not store unused data in the repository.

The CS node can make the monitoring information available to other devices either in a push scenario or a pull scenario. For example, when the Content Store node generates a Content Object that includes monitoring information, the Content Store node identifies a target network device that is to receive a type of monitoring information associated with the generated Content Object, and sends the generated Content Object to the target network device. As another example, the CS node can receive an Interest whose name identifies a type of monitoring information, and processes the Interest to return a Content Object that includes the requested monitoring information.

Figure 6:
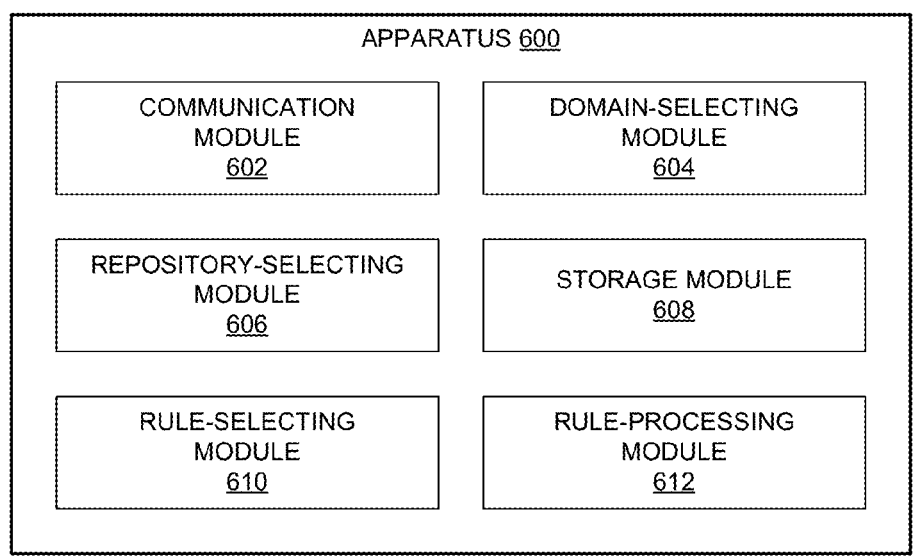
FIG. 6 illustrates an exemplary apparatus that facilitates caching data at various CS nodes for a publisher based on a domain associated with the publisher in accordance with an embodiment.

FIG. 6 illustrates an exemplary apparatus 600 that facilitates caching data at various CS nodes for a publisher based on a domain associated with the publisher in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a domain-selecting module 604, a repository-selecting module 606, a storage module 608, a rule-selecting module 610, and a rule-processing module 612.

In some embodiments, communication module 602 can receive or return Interests or Content Objects over an ICN. Domain-selecting module 604 can determine a domain associated with a Content Object that is to be cached, and repository-selecting module 606 can select a storage repository associated with the domain. Storage module 608 can store the Content Object in the selected repository. Rule-selecting module 610 can perform a lookup operation for a rule associated with an Interest's name to select a related rule, and rule-processing module 612 can execute the rule's commands.

Figure 7:
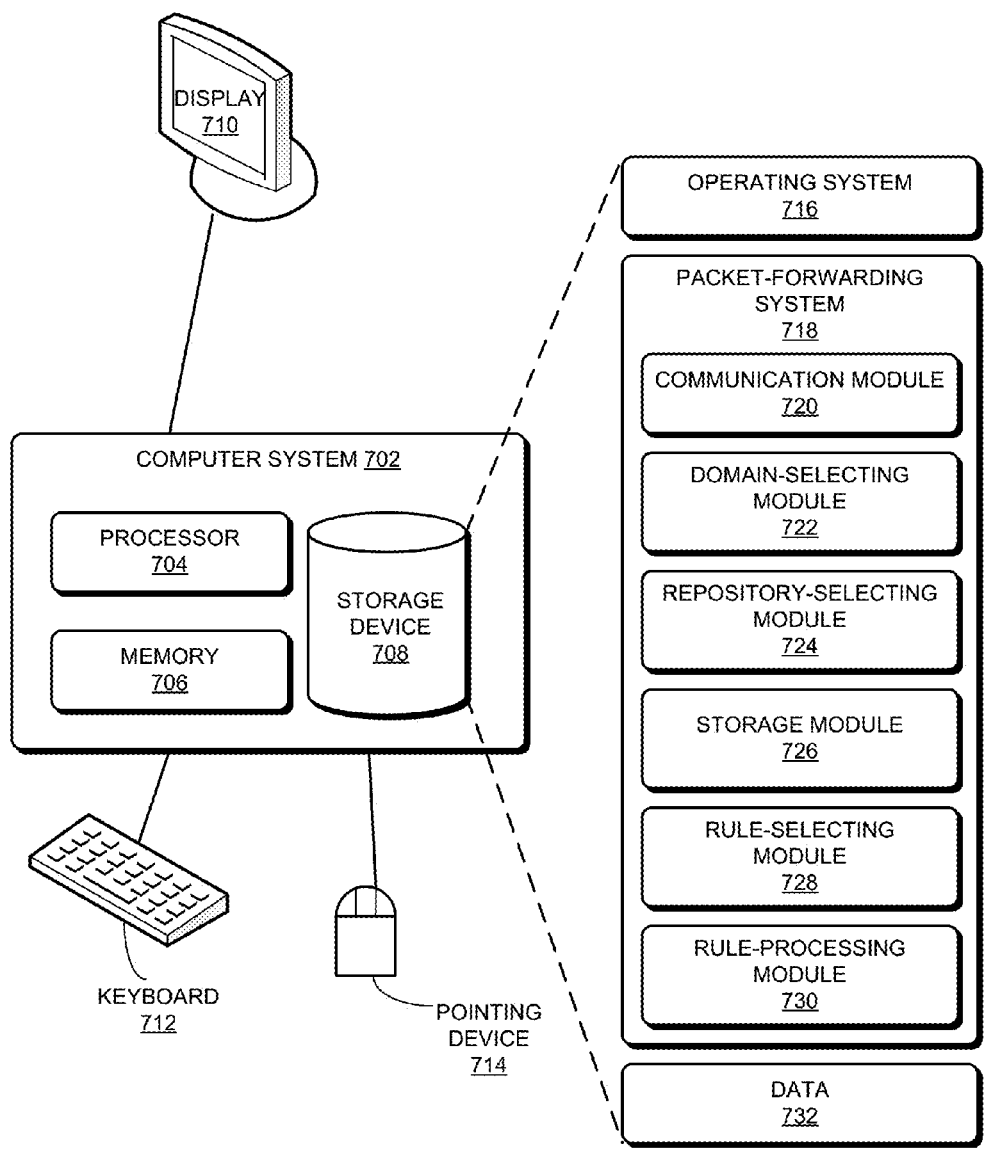
FIG. 7 illustrates an exemplary computer system that facilitates caching data at various CS nodes for a publisher based on a domain associated with the publisher in accordance with an embodiment.

FIG. 7 illustrates an exemplary computer system 702 that facilitates caching data at various CS nodes for a publisher based on a domain associated with the publisher in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, content store (CS) system 718, and data 732.

CS system 718 can include instructions, which when executed by computer system 702, can cause computer system 702 to perform methods and/or processes described in this disclosure. Specifically, CS system 718 may include instructions for receiving or returning Interests or Content Objects over an ICN (communication module 720). Further, CS system 718 can include instructions for determining a domain associated with a Content Object that is to be cached (domain-selecting module 722), and can also include instructions for selecting a storage repository associated with the domain (repository-selecting module 724). CS system 718 can also include instructions for storing the Content Object in the selected repository (storage module 726).

CS system 718 can also include instructions for performing a lookup operation for a rule associated with an Interest's name to select a related rule (rule-selecting module 728). CS system 718 can also include instructions for executing the rule's commands (rule-processing module 730).

Data 732 can include any data that is required as input or that is generated as output by the methods and/or processes described in this disclosure. Specifically, data 732 can store at least cached Content Objects for one or more domains.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a content-storing device, a Content Object, wherein the Content Object includes a name which is a hierarchically structured variable length identifier;
   determining, by the content-storing device, a content producer associated with the Content Object;
   selecting, by the content-storing device, for the Content Object, a first domain associated with the content producer, the first domain indicating a subscription;
   selecting, by the content-storing device, a first storage repository assigned to the first domain, wherein the first storage repository sends a first-resolution format of the Content Object;
   assigning, by the content-storing device, for the Content Object, a second domain for use other than the subscription;
   selecting, by the content-storing device, a second storage repository assigned to the second domain, wherein the second storage repository sends a second-resolution format of the Content Object, wherein the first-resolution format has a higher resolution than the second-resolution format;
   storing, by the content-storing device, the Content Object in the first and second storage repositories;
   receiving an Interest that specifies a name of the Content Object;
   determining whether the Interest has permission to access the first domain; and
   in response to determining that the Interest has permission to access the first domain, returning the first-resolution format of the Content Object from the first storage repository; or
   in response to determining that the Interest has no permission to access the first domain, returning the second-resolution format of the Content Object from the second storage repository.

2. The method of claim 1, further comprising:
   assigning the first storage repository to the first domain based on one or more of:
     an administrative attribute of the first storage repository;
     a typological attribute of the first storage repository;
     a performance attribute of the first storage repository;
     an ontological attribute of the first storage repository; and
     a security attribute of the first storage repository.

3. The method of claim 1, wherein each of the first storage repository and the second storage repository includes one or more of:
   a memory device;
   a local non-volatile storage device;
   a network storage device;
   a distributed data store; and
   a database.

4. The method of claim 1, further comprising:
   determining, by the content-storing device, one or more attributes of the Content Object, wherein the determined attributes of the Content Object include one or more of:
     an owner;
     a data size;
     a content name;
     a signer of the Content Object;
     a digital signature;
     a lifetime of the Content Object; and
     an access frequency of the Content Object.

5. The method of claim 1, further comprising:
   determining a set of domains associated with the Content Object; and
   determining, from the set of domains, a domain that the Interest has permission to access.

6. A non-transitory, computer-readable storage medium storing instructions that, when executed by a computer, cause the computer to perform a method, the method comprising:

receiving, by the computer, a Content Object, wherein the Content Object includes a name which is a hierarchically structured variable length identifier;

determining, by the computer, a content producer associated with the Content Object;

selecting, by the computer, for the Content Object, a first domain associated with the content producer, the first domain indicating a subscription;

selecting, by the computer, a first storage repository assigned to the first domain, wherein the first storage repository sends a first-resolution format of the Content Object;

assigning, by the computer, for the Content Object, a second domain for use other than the subscription;

selecting, by the computer, a second storage repository assigned to the second domain, wherein the second storage repository sends a second-resolution format of the Content Object wherein the first-resolution format has a higher resolution than the second-resolution format;

storing, by the computer, the Content Object in the first and second storage repositories;

receiving an Interest that specifies a name of the Content Object;

determining whether the Interest has permission to access the first domain; and in response to determining that the Interest has permission to access the first domain, returning the first-resolution format of the Content Object from the first storage repository; or in response to determining that the Interest has no permission to access the first domain, returning the second-resolution format of the Content Object from the second storage repository.

7. The storage medium of claim 6, wherein the method further comprises:
assigning the first storage repository to the first domain based on one or more of:
an administrative attribute of the first storage repository;
a typological attribute of the first storage repository;
a performance attribute of the first storage repository;
an ontological attribute of the first storage repository; and
a security attribute of the first storage repository.

8. The storage medium of claim 6, wherein the method further comprises:
determining, by the computer, one or more attributes of the Content Object, and the determined attributes of the Content Object include one or more of:
an owner;
a data size;
a content name;
a signer of the Content Object;
a digital signature;
a lifetime of the Content Object; and
an access frequency of the Content Object.

9. The storage medium of claim 6, wherein the method further comprises:
determining a set of domains associated with the Content Object; and
determining, from the set of domains, a domain that the Interest has permission to access.

10. A computer system, comprising:
a processor; and
a storage device for storing instructions that, when executed by the processor, cause the processor to perform a method, the method comprising
receiving, by the computer system, a Content Object, wherein the Content Object includes a name which is a hierarchically structured variable length identifiers
determining, by the computer system, a content producer associated with the Content Object;
selecting, by the computer system, for the Content Object, a first domain associated with the content producer, the first domain indicating a subscription;
selecting, by the computer system, a first storage repository assigned to the first domain, wherein the first storage repository sends a first-resolution format of the Content Object;
assigning, by the content-storing device, for the Content Object, a second domain for use other than the subscription;
selecting, by the content-storing device, a second storage repository assigned to the second domain, wherein the second storage repository sends a second-resolution format of the video stream of the Content Object, wherein the first-resolution format has a higher resolution than the second-resolution format;
storing, by the computer system, the Content Object in the first and second storage repositories;
receiving an Interest that specifies a name of the Content Object;
determining whether the Interest has permission to access the first domain; and
in response to determining that the Interest has permission to access the first domain, returning the first-resolution format of the Content Object from the first storage repository; or
in response to determining that the Interest has no permission to access the first domain, returning the second-resolution format of the Content Object from the second storage repository.

11. The computer system of claim 10, wherein the method further comprises:
assigning the first storage repository to the first domain based on one or more of:
an administrative attribute of the first storage repository;
a typological attribute of the first storage repository;
a performance attribute of the first storage repository;
an ontological attribute of the first storage repository; and
a security attribute of the first storage repository.

12. The computer system of claim 10, wherein the method further comprises:
determining, by the computer system, one or more attributes of the Content Object, and the determined attributes of the Content Object include one or more of:
an owner;
a data size;
a content name;
a signer of the Content Object;
a digital signature;
a lifetime of the Content Object; and
an access frequency of the Content Object.

13. The computer system of claim 10, wherein the method further comprises:
determining a set of domains associated with the Content Object; and determining, from the set of domains, a domain that the Interest has permission to access.

14. The method of claim 1, wherein each of the first storage repository and the second storage repository delivers a predetermined level of performance.

15. The storage medium of claim 6, wherein each of the first storage repository and the second storage repository delivers a predetermined level of performance.

16. The computer system of claim 10, wherein each of the first storage repository and the second storage repository delivers a predetermined level of performance.

17. The method of claim 1, wherein storing the Content Object in the first and second storage repositories includes storing only a first segment of the Content Object, and the method further comprises:
   pre-fetching later segments of the Content Object after receiving the Interest for the first segment of the Content Object.

18. The storage medium of claim 6, wherein storing the Content Object in the first and second storage repositories includes storing only a first segment of the Content Object, and the method further comprises:
   pre-fetching later segments of the Content Object after receiving the Interest for the first segment of the Content Object.

19. The computer system of claim 10, wherein storing the Content Object in the first and second storage repositories includes storing only a first segment of the Content Object, and the method further comprises:
   pre-fetching later segments of the Content Object after receiving the Interest for the first segment of the Content Object.

* * * * *